S. A. HOLMES.
Photographic Cameras.

No. 154,607. Patented Sept. 1, 1874.

Attest:
C. Clarence Poole
N. B. Smith

Inventor:
S. A. Holmes

UNITED STATES PATENT OFFICE.

SILAS A. HOLMES, OF NEW YORK, N. Y.

IMPROVEMENT IN PHOTOGRAPHIC CAMERAS.

Specification forming part of Letters Patent No. 154,607, dated September 1, 1874; application filed February 24, 1874.

*To all whom it may concern:*

Be it known that I, SILAS A. HOLMES, of the city, county, and State of New York, have invented a new and useful Improvement in Camera Obscuras; and I do hereby declare that the following is a full, clear, and exact description thereof, reference being had to the accompanying drawings, and to the letters of reference marked thereon, making part of this specification.

It is well known to all skillful photographers that it is necessary to fix the sensitive plate in a vertical position during exposure, and, when the nature of the subject admits, as nearly as possible parallel thereto, otherwise, perspective is destroyed and outlines are distorted. But when the camera-box is set in a truly horizontal position, the upper portions of the object—a tall building, for instance—are cut off by the mounting of the lens, or pass so obliquely through the same as to be obscured by refraction or the stop-diaphragm. To obviate these disadvantages and enable that portion of the object or view to be thrown properly upon the sensitive screen while the camera-box is in a horizontal position is the object of my invention, and it consists of an intermediate adjustable mounting, to be placed between the lens-tube and the camera-box, whereby the axis of the lens may be directed to a point oblique to the plane of the sensitive plate, and also in a rotary carrier to hold said mounting, so that it may be rotated around the axis of the lens, and thereby enable said axis to be adjusted either as to vertical or lateral obliquity.

That others may more fully understand my invention, I will particularly describe the mode of construction which I prefer.

Figure 1:
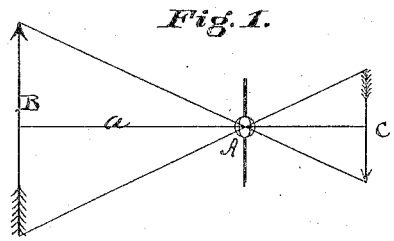
Figure 2:
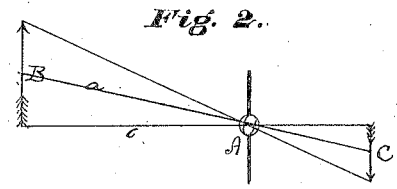
Figure 3:
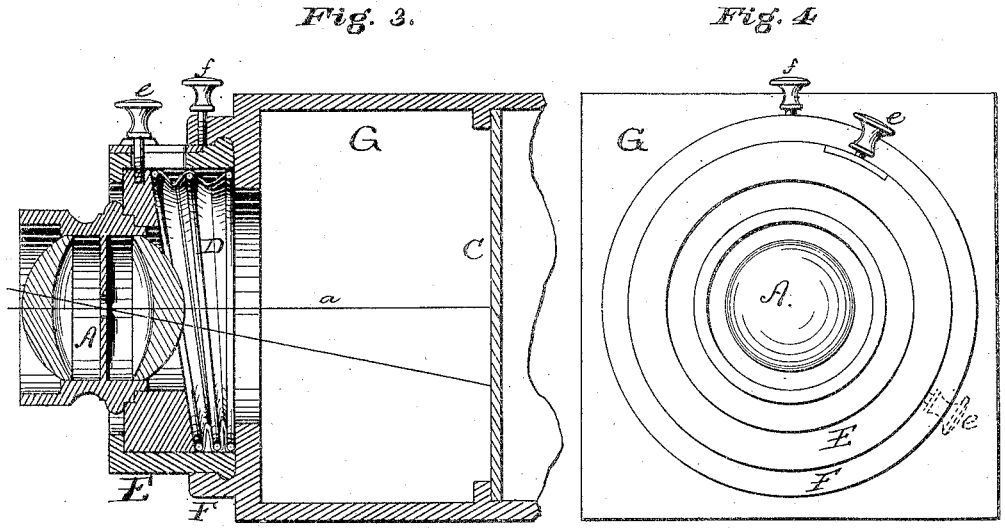
Figure 4:
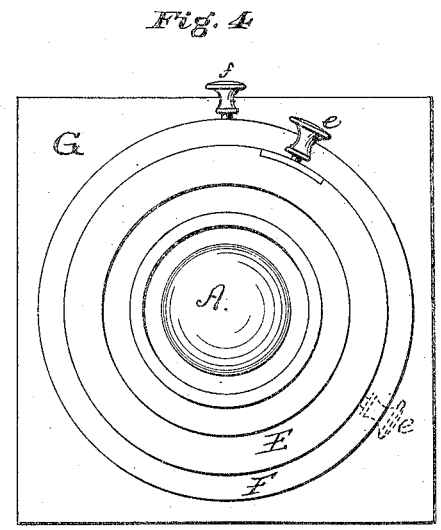
Figure 5:
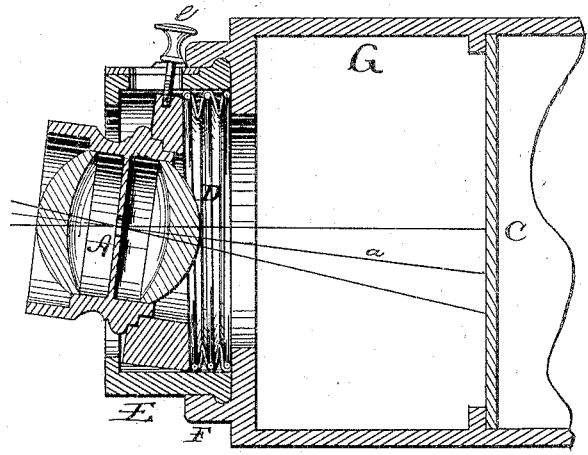

Figures 1 and 2 are diagrams illustrating the principle upon which my improvement is founded. Fig. 3 is a longitudinal section of my invention. Fig. 4 is a front elevation of the same. Fig. 5 represents my improvement in oblique adjustment.

In Figs. 1 and 2 is represented a lens, A, with the figure of an object, B, projected upon a screen or sensitive plate at C, within a camera-box, G. In cameras as heretofore constructed, the lens A is fixed, so that, supposing only one-half of the object B is required or is desired, then its image is received through the lens in the least advantageous manner, i. e., the axis $a$ of the lens, around which there is the smallest quantity of aberration, is at one side of or beyond the object B. In Fig. 2, the lens A is shown partially rotated in its cell, so as to present its axis $a$ to the center of the object B without altering the relative parallelism of the said object B and the sensitive screen C.

To carry out my invention I mount the lens A and its cell upon a bellows, D, within a carrier-ring or collar, E. One side of said bellows may be depressed, as shown in Fig. 5, and carry the lens with it so as to make the axis $a$ of the same oblique to the sensitive screen C, and it may be held in that position by a set-screw, $e$, which passes through a slot in the side of the carrier E. It is required that the axis $a$ shall be capable of direction, either vertically or laterally, and I therefore make the carrier E capable of rotation around its own axis, and I do this by making the said carrier with a lateral flange around its base, and secure the same by a counter-flanged collar, F, within which the carrier E may rotate, and the set-screw $f$ serves to hold the carrier E in the desired position.

Having now described my invention, what I claim as new is—

1. In combination with a camera-box, G, and lens A, an adjustable mounting, D, substantially as described.

2. In combination with a camera-box, G, and lens A and adjustable mounting D, the carrier E, made capable of rotation around its own axis, as and for the purpose set forth.

SILAS A. HOLMES.

Witnesses:
HENRY C. BANKS,
W. H. NEWSCHAFER.